United States Patent
Perneti et al.

(10) Patent No.: US 11,507,451 B2
(45) Date of Patent: Nov. 22, 2022

(54) SYSTEM AND METHOD FOR BUG DEDUPLICATION USING CLASSIFICATION MODELS

(71) Applicant: EMC IP Holding Company LLC, Hopkinton, MA (US)

(72) Inventors: Jayanth Kumar Reddy Perneti, Horamavu (IN); Vindhya Gangaraju, Davanagere (IN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/206,292

(22) Filed: Mar. 19, 2021

(65) Prior Publication Data

US 2022/0300367 A1 Sep. 22, 2022

(51) Int. Cl.
*G06F 11/00* (2006.01)
*G06F 11/07* (2006.01)
*G06F 16/215* (2019.01)
*G06N 20/00* (2019.01)

(52) U.S. Cl.
CPC ...... *G06F 11/0793* (2013.01); *G06F 11/0751* (2013.01); *G06F 16/215* (2019.01); *G06N 20/00* (2019.01)

(58) Field of Classification Search
CPC ............ G06F 11/0793; G06F 11/0751; G06F 16/215; G06N 20/00
USPC ....................................................... 714/1–57
See application file for complete search history.

(56) References Cited

U.S. PATENT DOCUMENTS

| | | | | |
|---|---|---|---|---|
| 8,966,453 | B1 * | 2/2015 | Zamfir | G06F 11/3604 717/124 |
| 2002/0188715 | A1 * | 12/2002 | McKenzie, Jr. | G06F 9/453 709/224 |
| 2003/0097608 | A1 * | 5/2003 | Rodeheffer | G06F 11/106 714/6.2 |
| 2004/0078669 | A1 * | 4/2004 | Lang | G06F 11/0748 714/27 |
| 2014/0365828 | A1 * | 12/2014 | Jiang | G06F 11/0709 714/37 |
| 2015/0347212 | A1 * | 12/2015 | Bartley | G06F 11/0709 714/37 |
| 2021/0264025 | A1 * | 8/2021 | Givental | G06F 21/577 |
| 2021/0406671 | A1 * | 12/2021 | Gasthaus | G06F 16/2379 |

* cited by examiner

*Primary Examiner* — Sarai E Butler

(74) *Attorney, Agent, or Firm* — Chamberlain, Hrdlicka, White, Williams & Aughtry

(57) ABSTRACT

A method for managing bugs includes obtaining, by a bug deduplication system, a set of bugs, performing an encoding on each section of a first bug of the set of bugs to obtain encoded sections, wherein the encoded sections comprise a first encoded section and a second encoded section, applying a first classification model to the first encoded section to obtain a first section score, applying a second classification model to the second encoded section to obtain a second section score, generating a confidence score based on the first encoded section and the second section, and providing the confidence score to a client, wherein the client initiates a corrective action for the first bug based on the confidence score.

20 Claims, 7 Drawing Sheets

Bug Tracking System 350

Application A Bug Report 352

| Bug ID | Component Information | Summary | Comments |
|---|---|---|---|
| BA1 | Application A; OS 1 | Incompatibility with Operating System | Portions of the application will not operate using the current operating system |
| BA2 | Application A | User Interface Error | User interface cannot render using the current operating system |
| BA3 | Application A; OS 1 | Incompatibility with Operating System | The current operating system is not compatible with portions of the application as executed. |
| BA4 | Application A; Production Host A | Excess Use of Memory | Portions of the application are attempting to use more memory than expected and/or available |
| BA5 | Application A | Rendering Error | Application fails to render |

FIG. 3B

SYSTEM AND METHOD FOR BUG DEDUPLICATION USING CLASSIFICATION MODELS

BACKGROUND

Computing devices in a system may include any number of internal components such as processors, memory, and persistent storage. As computing devices experience failures, a bug tracking system may track undesirable behaviors by applications executed using the internal components.

SUMMARY

In general, in one aspect, the invention relates to a method for managing bugs. The method includes obtaining, by a bug deduplication system, a set of bugs, performing an encoding on each section of a first bug of the set of bugs to obtain encoded sections, wherein the encoded sections comprise a first encoded section and a second encoded section, applying a first classification model to the first encoded section to obtain a first section score, applying a second classification model to the second encoded section to obtain a second section score, generating a confidence score based on the first encoded section and the second section, and providing the confidence score to a client, wherein the client initiates a corrective action for the first bug based on the confidence score.

In general, in one aspect, the invention relates to a non-transitory computer readable medium that includes computer readable program code, which when executed by a computer processor enables the computer processor to perform a method for managing bugs. The method includes obtaining, by a bug deduplication system, a set of bugs, performing an encoding on each section of a first bug of the set of bugs to obtain encoded sections, wherein the encoded sections comprise a first encoded section and a second encoded section, applying a first classification model to the first encoded section to obtain a first section score, applying a second classification model to the second encoded section to obtain a second section score, generating a confidence score based on the first encoded section and the second section, and providing the confidence score to a client, wherein the client initiates a corrective action for the first bug based on the confidence score.

In general, in one aspect, the invention relates to a system that includes a processor and memory that includes instructions, which when executed by the processor, perform a method. The method includes obtaining, by a bug deduplication system, a set of bugs, performing an encoding on each section of a first bug of the set of bugs to obtain encoded sections, wherein the encoded sections comprise a first encoded section and a second encoded section, applying a first classification model to the first encoded section to obtain a first section score, applying a second classification model to the second encoded section to obtain a second section score, generating a confidence score based on the first encoded section and the second section, and providing the confidence score to a client, wherein the client initiates a corrective action for the first bug based on the confidence score.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 3A-3C show an example in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing a set of bugs. The bugs may be bugs generated by a bug tracking system. Embodiments of the invention include using a bug deduplication system that obtains a set of bugs from a bug tracking system. The bug tracking system may be an open-source application that monitors applications executing in a production host environment. The set of bugs may include duplicate bugs. The bug deduplication system may divide the set into a training set and a sample set. The training set is used to generate classification models for each section of the bugs.

The sections of each bug in the sample sets may be applied to the generated classification model to compare each bug in the sample set to the rest of the bugs in the set to obtain confidence scores that specify a relative similarity of the bug to each other bug in the set. Each bug with a confidence score above a predetermined threshold is specified in a bug deduplication report (along with the corresponding similar bug). The bug deduplication report is sent to a client, where a corrective action may be performed.

Figure 1:
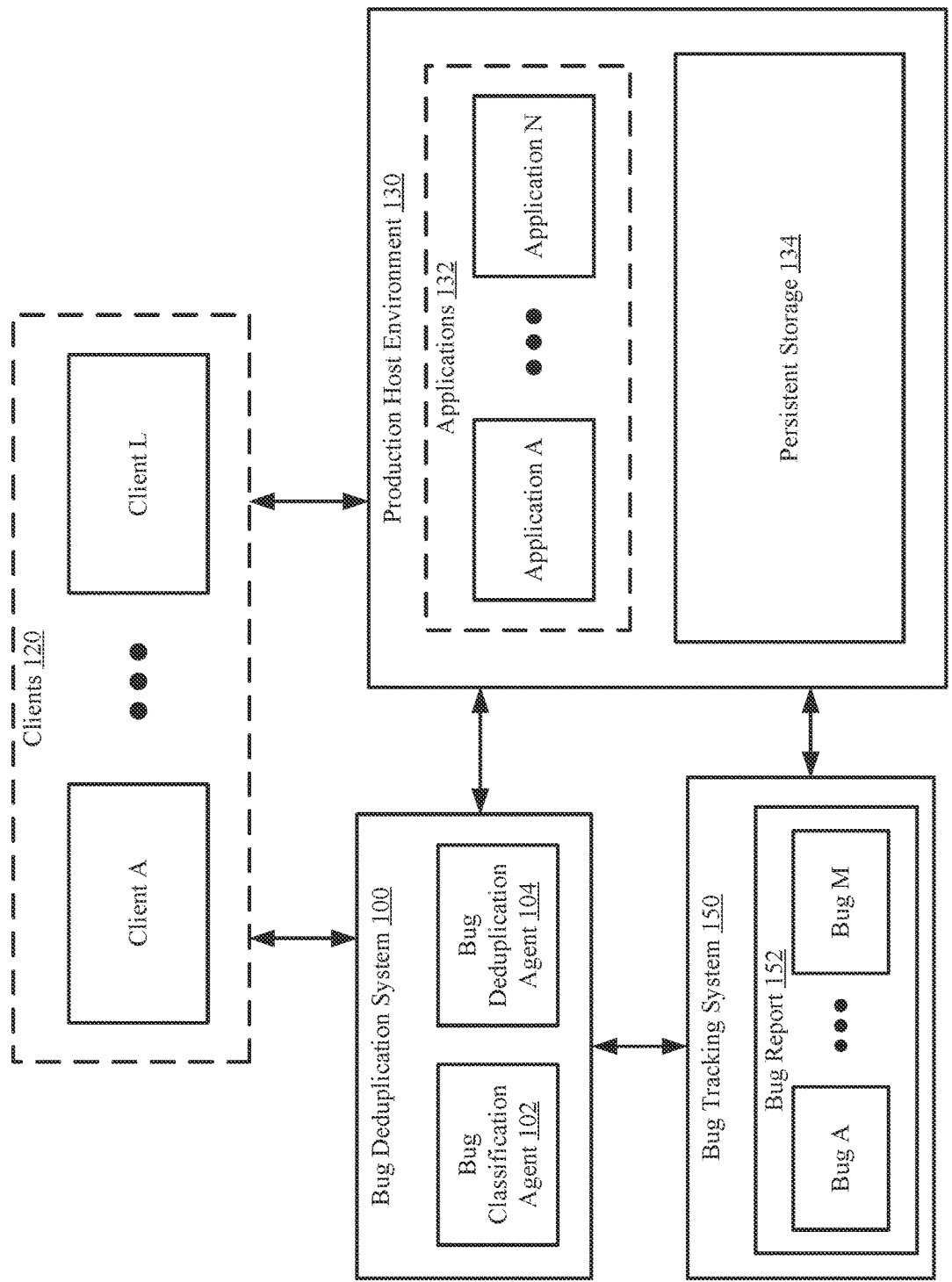
FIG. 1 shows a diagram of a system in accordance with one or more embodiments of the invention.

FIG. 1 shows an example system in accordance with one or more embodiments of the invention. The system includes a bug deduplication system (110), one or more clients (120), a production host environment (130) and a bug tracking system (150). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the bug deduplication system (100) manages the deduplication of bugs obtained from the bug tracking system (150). The bug deduplication system (100) may manage the bugs by performing the methods illustrated in FIGS. 2A and 2B. The bug deduplication system (100) may include a bug classification agent (102) and a bug deduplication agent (104). The bug deduplication system (100) may include additional, fewer, and/or different components without departing from the invention.

In one or more embodiments of the invention, the bug classification agent (102) generates classification models to be used for classifying sections of a bug. The bug classification agent (102) may generate the classification models in accordance with FIG. 3A. In one or more embodiments of the invention, as discussed throughout the application, a bug is a data structure that specifies an issue corresponding to an application executing on the production host environment (130). Each bug may include multiple sections (discussed in FIG. 3A) that each describe a portion of the issue.

In one or more embodiments of the invention, the bug deduplication agent (104) compares bugs in a bug report (152) generated by the bug tracking system (150). The bug deduplication agent (104) may include functionality for generating confidence scores and credibility scores for each compared bug pair. The confidence scores and credibility scores may be generated in accordance with FIG. 3B.

Figure 4:
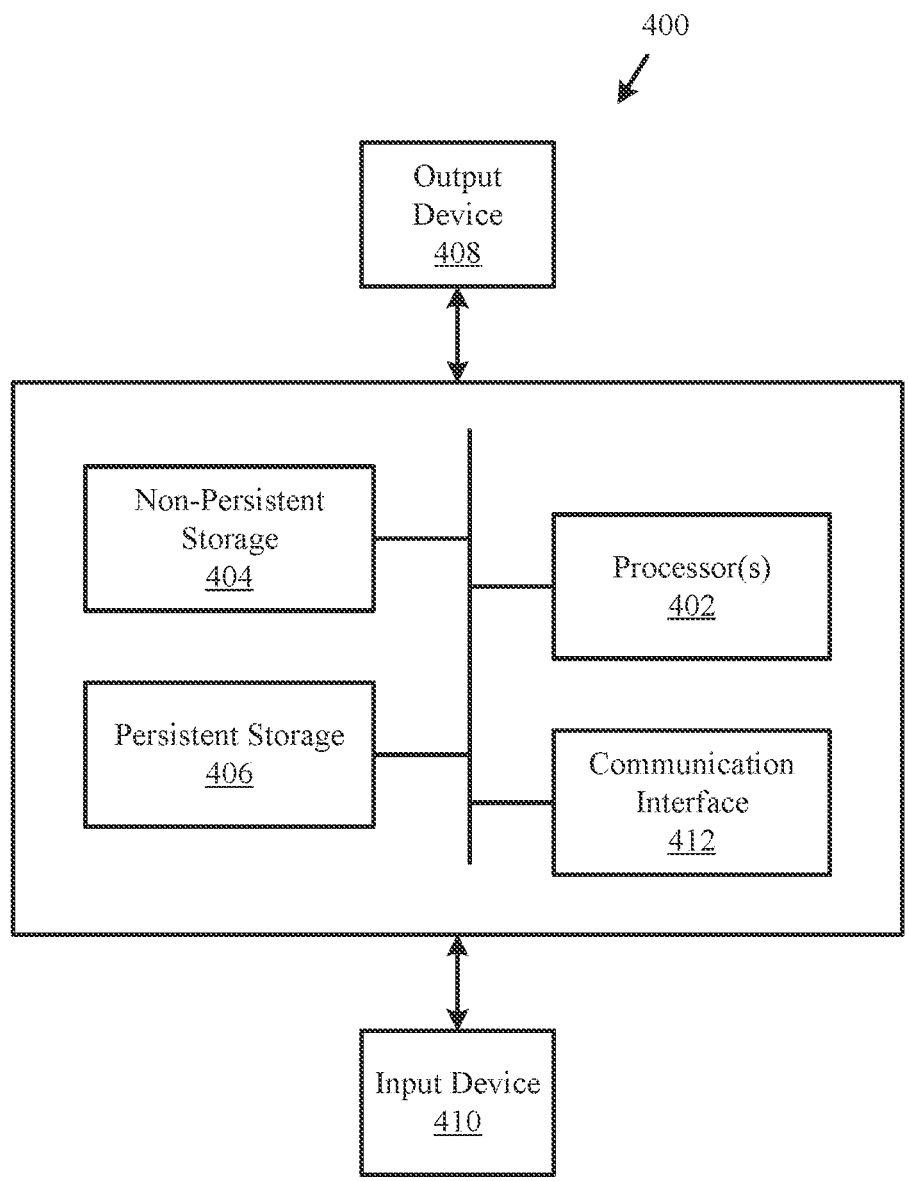
FIG. 4 shows a diagram of a computing device in accordance with one or more embodiments of the invention.

In one or more embodiments of the invention, the bug deduplication system (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the bug deduplication system (100) described throughout this application and/or all, or a portion thereof, of the methods illustrated in FIGS. 2A-2B.

In one or more embodiments of the invention, the bug deduplication system (100) is implemented as a logical device. The logical device may utilize the computing resources of any number of computing devices and thereby provide the functionality of the bug deduplication system (100) described throughout this application and/or all, or a portion thereof, of the methods illustrated in FIGS. 2A-2B.

In one or more embodiments of the invention, the production host environment (130) hosts applications (132). The applications (132) may be logical entities executed using computing resources (not shown) of the production host environment (130). Each of the applications may be performing similar or different processes. In one or more embodiments of the invention, the applications (132) provide services to users, e.g., clients (not shown). For example, the applications (132) may host components. The components may be, for example, instances of databases, email servers, and/or other components. The applications (132) may host other types of components without departing from the invention.

In one or more embodiments of the invention, the applications (132) are implemented as computer instructions, e.g., computer code, stored on a persistent storage (e.g., 134) that when executed by a processor(s) of the production host environment (130) cause the production host environment (130) to provide the functionality of the applications (132) described throughout this application.

In one or more embodiments of the invention, the production host environment (130) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

In one or more embodiments of the invention, the production host environment (130) is implemented as a logical device. The logical device may utilize the computing resources of any number of computing devices and thereby provide the functionality of the production host environment (130) described throughout this application.

In one or more embodiments of the invention, the bug tracking system (150) is a system for monitoring and testing the applications (132) to identify issues during operation of the applications (132) and generating bug reports (152). The bug report (152) may specify any number of bugs, at least a portion of which may be duplicates of other bugs in the bug report (152). The bug report (152) may be provided to the bug deduplication system (100) for deduplication.

In one or more embodiments of the invention, each of the bug tracking system (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the bug tracking system (150) described throughout this application.

In one or more embodiments of the invention, the bug tracking system (150) is implemented as a logical device. The logical device may utilize the computing resources of any number of computing devices and thereby provide the functionality of the bug tracking system (150) described throughout this application.

Figure 2A:
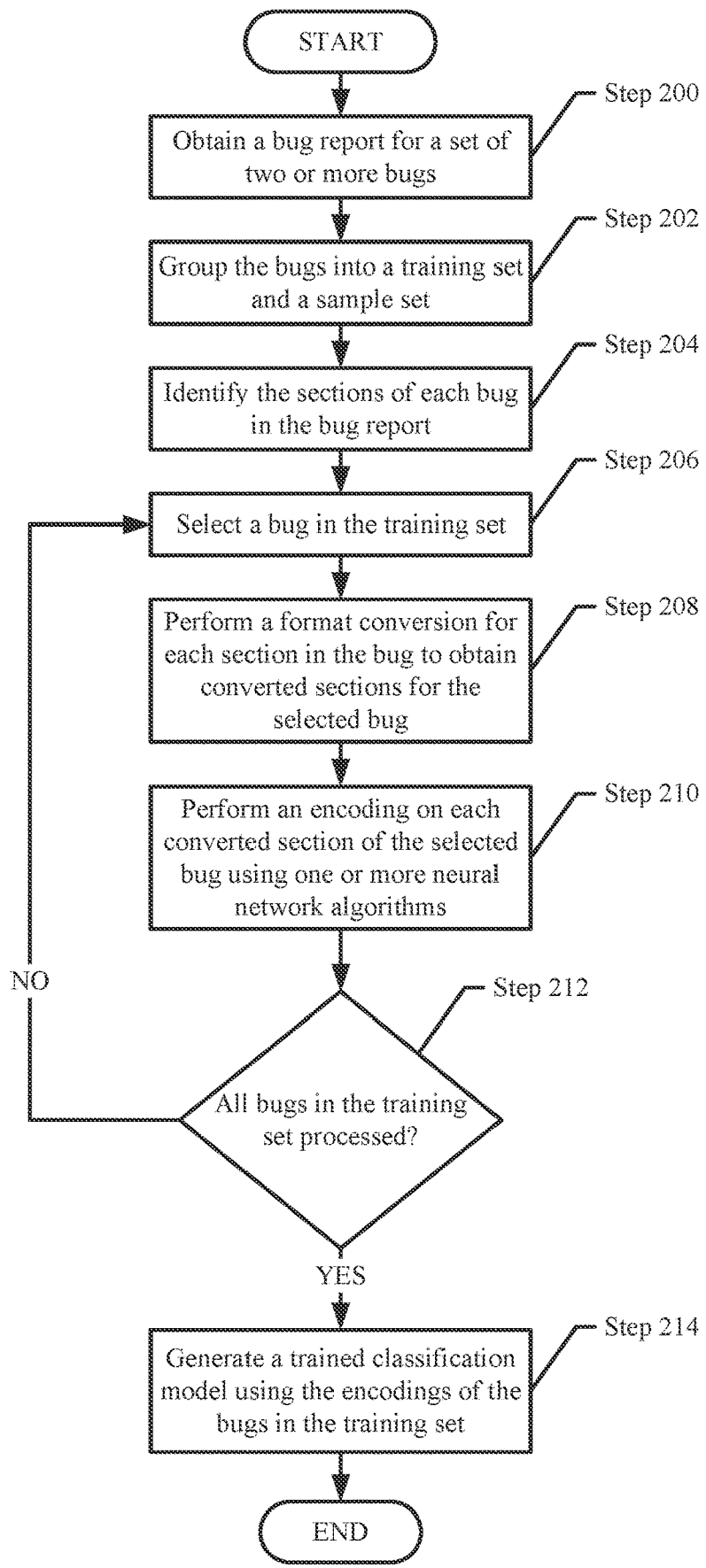
FIG. 2A shows a flowchart for managing a training set of bugs in accordance with one or more embodiments of the invention.
Figure 2B:
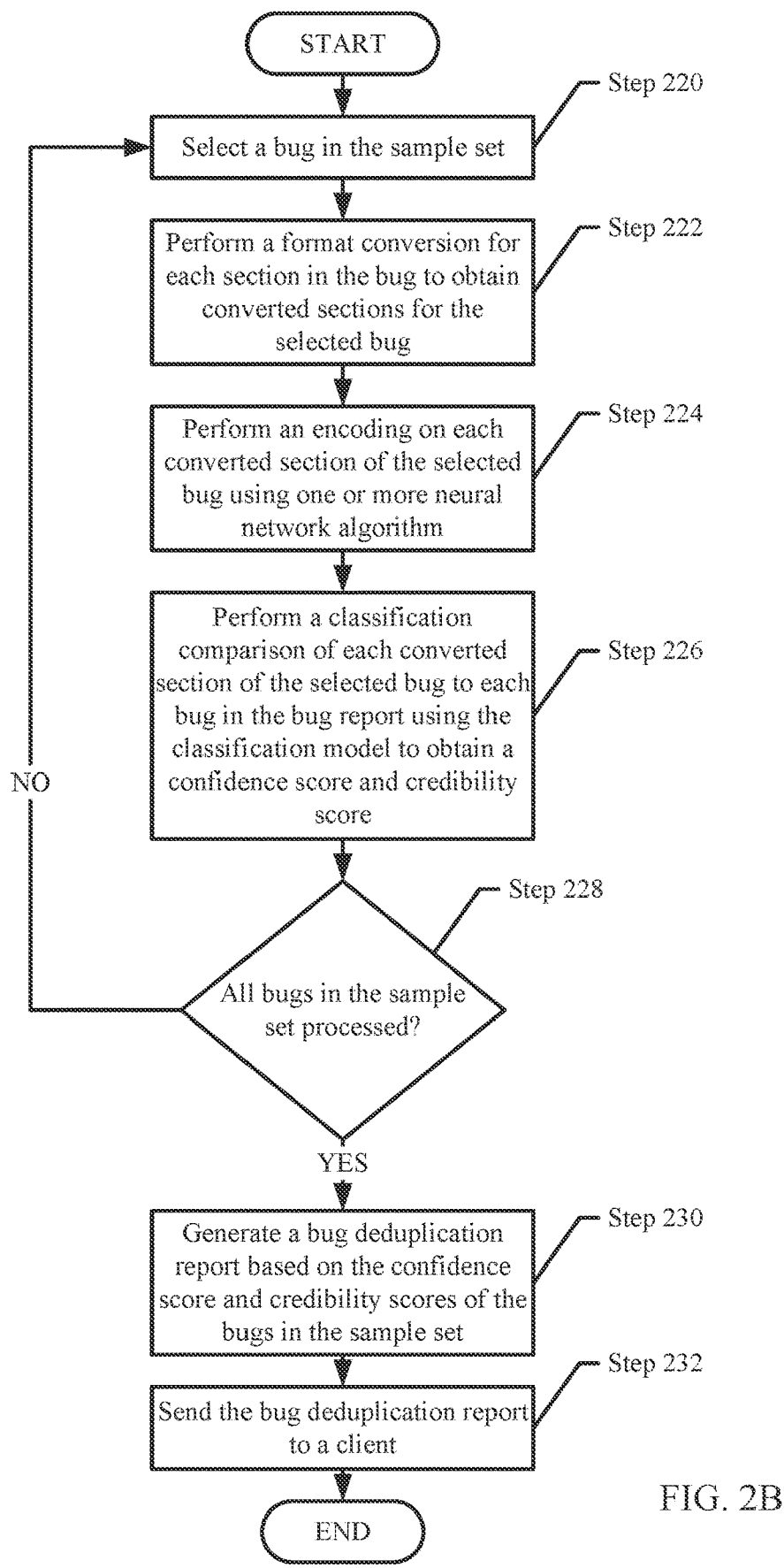
FIG. 2B shows a flowchart for managing a sample set of bugs in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for managing a training set of bugs in accordance with one or more embodiments of the invention. The method shown in FIG. 2A may be performed by, for example, an bug deduplication system (e.g., 120, FIG. 1). Other components of the system illustrated in FIG. 1 may perform the method of FIG. 2A without departing from the invention.

Turning to FIG. 2A, in step 200, a bug report is obtained for a set of two or more bugs. In one or more embodiments of the invention, the bug report may specify two or more issues detected by the bug tracking system during the monitoring of the applications. As discussed above, the bugs may be duplicates of other bugs in the bug report.

In step 202, the bugs are grouped into a training set and a sample set. In one or more embodiments of the invention, the bugs are grouped randomly. In other words, the selection of a bug to the training set or to the sample set may be performed randomly. In one or more embodiments of the invention, the ratio of the number of bugs in the training set and the number of bugs in the sample set may be a predetermined value set by an administrator managing the operation of the bug deduplication system. For example, the administrator may set a high value for the ratio, which may result in a significantly higher number of bugs in the training set than in the sample set.

In step 204, sections of each bug is identified. In one or more embodiments of the invention, a section is a portion of the bug that specifies a portion of the issue in a specific manner Said another way, a section of a bug may include information about a portion of the issue such that the sections of the bug collectively describe the issue as a whole. For example, a bug may include a summary of the issue, a component issue description, and a long description.

In step 206, a bug in the training set is selected. The selected bug may be a bug that has not been processed.

In step 208, a format conversion is performed for each section in the bug to obtain converted sections. In one or more embodiments of the invention, a format conversion is a process for converting a section of a bug into a format usable for an encoding to be applied. For example, a section, prior to the conversion may be in a format (e.g., a natural language) that is readable to a user. After the conversion, the converted section may be, for example, a numerical value.

In step 210, an encoding is performed on each converted section of the selected bug using one or more neural network algorithms. In one or more embodiments of the invention, a neural network algorithm is a type of machine learning algorithm that utilizes a series of layers applied to portions of multiple sets of data items (e.g., converted sections).

In step 212, a determination is made about whether all bugs in the training set are processed. If all bugs in the training set are processed, the method proceeds to step 214; otherwise, the method proceeds to step 206.

In step 214, a trained classification model is generated using the encodings of the bugs in the training set. In one or more embodiments of the invention, a trained classification model is generated for each encoded section of a bug. In such embodiments, multiple trained classifications may be generated.

FIG. 2B shows a flowchart for processing a sample set of bugs in accordance with one or more embodiments of the invention. The method shown in FIG. 2B may be performed by, for example, the bug deduplication system (e.g., 120, FIG. 1). Other components of the system illustrated in FIG. 1 may perform the method of FIG. 2B without departing from the invention.

In step 220, a bug in the sample set is selected. The selected bug may be a bug in the sample set that has not been processed.

In step 222, a format conversion may be performed on each section of the selected bug to obtain converted sections. In one or more embodiments of the invention, the format conversion performed on the selected bug may be similar to that discussed in step 208 of FIG. 2A.

In step 224, an encoding is performed on each converted section of the selected bug. In one or more embodiments of the invention, the encoding performed on the selected bug is similar to that discussed in step 210 of FIG. 2A.

In step 226, a classification comparison of each converted section is performed to each converted section of the bug in the bug report.

In step 228, a determination is made about whether all bugs in the sample set are processed. If all bugs in the sample set are processed, the method proceeds to step 230; otherwise, the method proceeds to step 220.

In step 230, following the determination that all bugs in the sample set have been processed, a bug deduplication report is generated based on the confidence scores and the credibility scores of the bugs in the sample set. In one or more embodiments of the invention, the bug deduplication report specifies bug pairs that correspond to a confidence score that reaches or exceeds a threshold. For example, a confidence score threshold of 0.80 may be set for the bug deduplication report. Bug pairs with a confidence score of 0.80 or higher may be specified. Additionally, the corresponding confidence score and/or credibility scores may be specified as well.

In step 232, the bug deduplication report is sent to a client. In one or more embodiments of the invention, the client may perform a corrective action in response to obtaining the bug deduplication report. For example, the corrective action may include removing all redundant bugs from the bug report.

Example

Figure 3A:
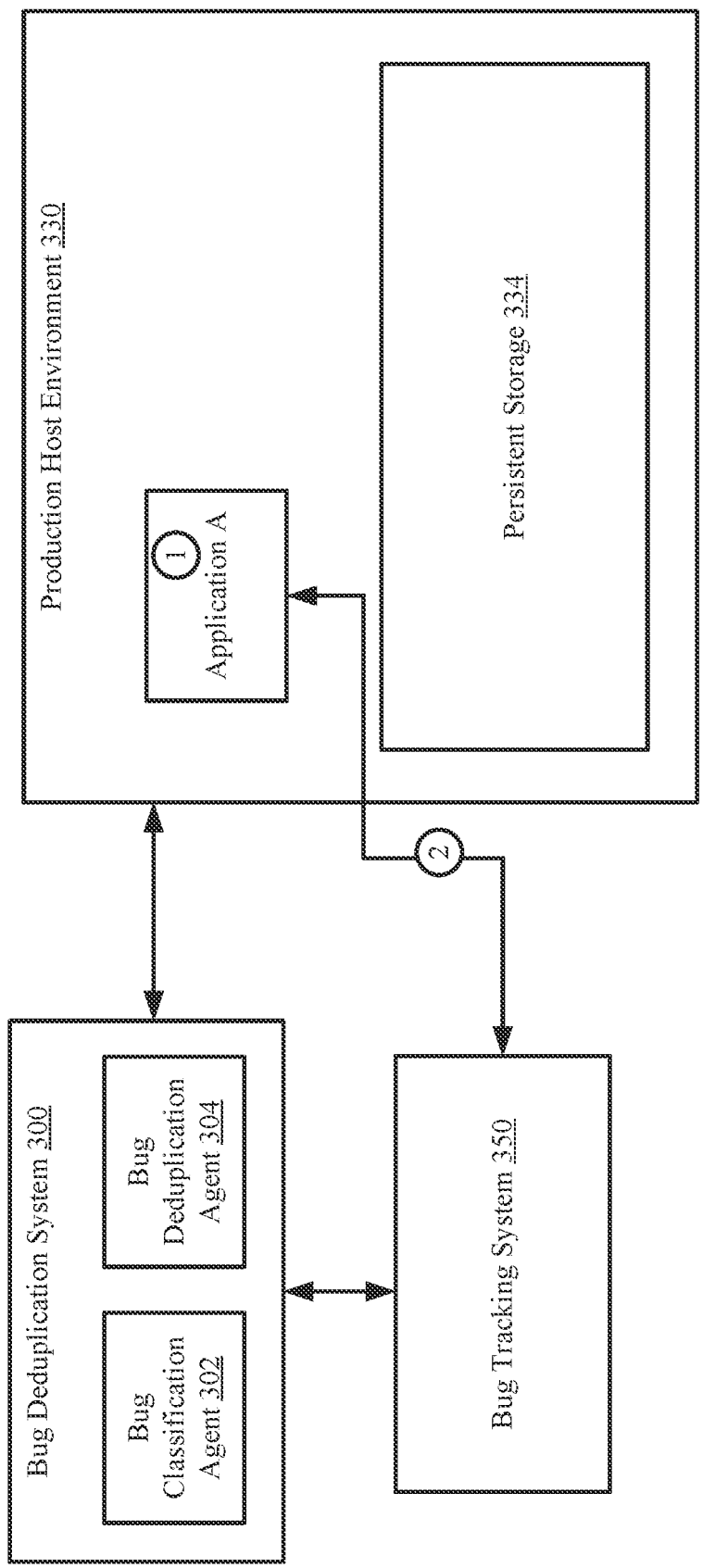
Figure 3C:
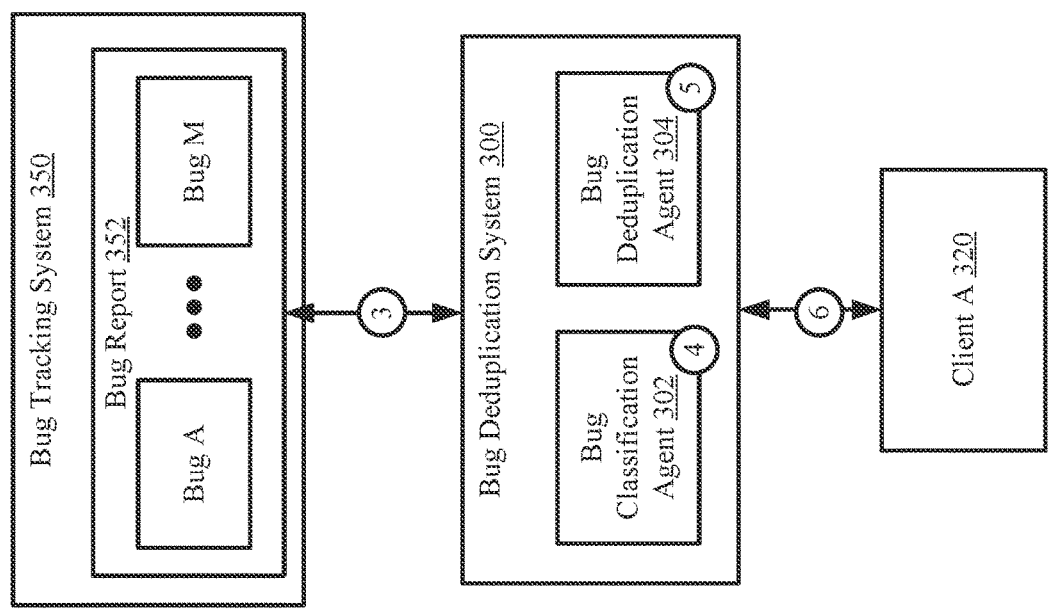

The following section describes an example. The example, illustrated in FIGS. 3A-3C, is not intended to limit the invention and is independent from any other examples discussed in this application. Turning to the example, consider a scenario in which an autonomous vehicle edge device is implementing an image segmentation model while driving.

FIG. 3A shows an example system in accordance with one or more embodiments of the invention. For the sake of brevity, not all components of the example system may be illustrated. The example system includes a production host environment (330), a bug tracking system (350), and a bug deduplication system (300).

At a first point in time, an application A is executing on the production host environment (330). The application may utilize any computing resources (physical or logical) provided by the production host environment (330). In this example, the computing resources may include an operating system, the persistent storage (334), memory, and any central processing units (CPUs) of the production host environment (330) [1]. During the operation of the application, a testing is performed by the bug tracking system (350) to identify any issues during operation of the application [2].

FIG. 3B shows a diagram of the bug tracking system. The bug tracking system (350), during the monitoring of application A, generates a bug report (352) with five bugs generated. Each bug includes a bug ID and three encodable sections. The encodable sections include a component information, a summary of the bug, and a comments. The component information specifies components of the production host environment (330) that affect, are affected by, and/or are otherwise involved in the corresponding issue. The summary is a short description of the issue written in a natural language (e.g., English). The comments are a description of the issue, written in a natural language, that is usually longer than the summary.

As illustrated in FIG. 3B, bugs BA1 and BA3 utilize the same components and include similar summaries and comments. Specifically, BA1 and BA3 specify components of the application not being compatible with the operating system in which the application is executing. Additionally, BA2 specifies a component (i.e., the user interface) not being compatible with the current operating system. While the natural language used to describe bugs BA1, BA2, and BA3 use different words, bugs BA1, BA2, and BA3 likely describe a similar issue. Bugs BA1 and BA3 may seem more closely related in terms of the words used to describe the issue.

Turning to FIG. 3C, the bug report (352) is obtained by the bug deduplication system (300) [3]. The bug deduplication system (300) uses a bug classification agent (302) to perform the method of FIG. 3A. Specifically, the bug classification agent (302) groups the bugs in the bug report (352) into a training set and a sample set. Further, the bug classification agent (302) encodes each of the aforementioned sections of the bugs in the training set into numerical values based on the words. Specifically, the component information is encoded using a single layer neural network, the summary is encoded using the bi-LSTM algorithm, and the comments are encoded using multiple CNNs with varying filters in different layers [4]. The result is a set of classification models to be applied to the bugs in the sample set. A first classification model corresponds to the component information of a bug, a second classification model corresponds to the summary, and a third classification model corresponds to the comments.

Following the generation of the classification models, the bug deduplication agent (304) applies the corresponding classification models to the bugs in the sample set in accordance with FIG. 3B. After applying the classification models to each bug in the sample set, a confidence score is generated for each bug pair that is compared in the sample set to the remaining bugs in the bug report (352) [5]. The confidence scores that are above a predefined threshold of 0.80 are specified in a bug deduplication report. A confidence score of 0.90 is generated for a bug pair of BA1 and BA3. A second confidence score of 0.81 is generated for a bug pair of BA1 and BA2. The two bug pairs are specified in the bug deduplication report. The bug deduplication report is provided to the client (320) [6].

Following obtaining the bug deduplication report, the client (320) performs a corrective action. The corrective action includes determining that bugs BA1 and BA3 address the same issue and removing one of the redundant bugs.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention enable reduction of redundant bugs generated using an open-source bug tracking system. Because an issue with an application may be documented multiple times by the bug tracking system, and because the bug tracking system may generate bugs in large quantities, embodiments of the invention reduce the cognitive burden of a user to identify the redundant bugs and perform corrective actions to improve the performance of the applications being monitored.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing bugs, the method comprising:
obtaining, by a bug deduplication system, a set of bugs;
performing an encoding on each section of a first bug of the set of bugs to obtain encoded sections, wherein the encoded sections comprise a first encoded section and a second encoded section, wherein each section of the first bug comprises a portion of an issue associated with the first bug, and wherein the encoded sections are generated using a neural network algorithm;

applying a first classification model to the first encoded section to obtain a first section score;
applying a second classification model to the second encoded section to obtain a second section score;
generating a confidence score based on the first encoded section and the second encoded section; and
providing the confidence score to a client,
wherein the client initiates a corrective action for the first bug based on the confidence score.

2. The method of claim 1, further comprising:
prior to performing the encoding:
performing a format conversion on each bug in the set of bugs to obtain a set of reformatted bugs,
wherein the first bug is a reformatted bug of the set of reformatted bugs.

3. The method of claim 1,
wherein the set of bugs is associated with an application,
wherein the application is monitored using a bug tracking system operatively connected to the bug deduplication system, and
wherein the set of bugs is obtained from the bug tracking system.

4. The method of claim 1, wherein the first classification model is generated using a machine learning model applied to first encoded sections of a first portion of the set of bugs, wherein the first encoded sections do not include the first encoded section.

5. The method of claim 4, wherein the first bug is associated with a second portion of the set of bugs.

6. The method of claim 1, wherein a section of the first bug comprises at least one of: structured information, a summary of the first bug, and a long description.

7. The method of claim 1, further comprising:
performing a second encoding on each section of a second bug of the set of bugs to obtain additional encoded sections, wherein the additional encoded sections comprise a third encoded section and a fourth encoded section;
applying a third classification model to the third encoded section to obtain a third section score;
applying a fourth classification model to the fourth encoded section to obtain a fourth section score;
generating a second confidence score based on the third encoded section and the fourth encoded section.

8. The method of claim 7, further comprising:
making a determination that the confidence score and the second confidence score meet a confidence threshold, and
based on the determination, sending a bug deduplication report to the client, wherein the confidence score and the second confidence score are specified in the bug deduplication report.

9. A non-transitory computer readable medium comprising computer readable program code, which when executed by a computer processor enables the computer processor to perform a method for managing bugs, the method comprising:
obtaining, by a bug deduplication system, a set of bugs;
performing an encoding on each section of a first bug of the set of bugs to obtain encoded sections, wherein the encoded sections comprise a first encoded section and a second encoded section, wherein each section of the first bug comprises a portion of an issue associated with the first bug, and wherein the encoded sections are generated using a neural network algorithm;
applying a first classification model to the first encoded section to obtain a first section score;
applying a second classification model to the second encoded section to obtain a second section score;
generating a confidence score based on the first encoded section and the second encoded section; and
providing the confidence score to a client,
wherein the client initiates a corrective action for the first bug based on the confidence score.

10. The non-transitory computer readable medium of claim 9, the method further comprising:
prior to performing the encoding:
performing a format conversion on each bug in the set of bugs to obtain a set of reformatted bugs,
wherein the first bug is a reformatted bug of the set of reformatted bugs.

11. The non-transitory computer readable medium of claim 9,
wherein the set of bugs is associated with an application,
wherein the application is monitored using a bug tracking system operatively connected to the bug deduplication system, and
wherein the set of bugs is obtained from the bug tracking system.

12. The non-transitory computer readable medium of claim 9, wherein the first classification model is generated using a machine learning model applied to first encoded sections of a first portion of the set of bugs, wherein the first encoded sections do not include the first encoded section.

13. The non-transitory computer readable medium of claim 12, wherein the first bug is associated with a second portion of the set of bugs.

14. The non-transitory computer readable medium of claim 9, wherein a section of the first bug comprises at least one of: structured information, a summary of the first bug, and a long description.

15. The non-transitory computer readable medium of claim 9, the method further comprising:
performing a second encoding on each section of a second bug of the set of bugs to obtain additional encoded sections, wherein the additional encoded sections comprise a third encoded section and a fourth encoded section;
applying a third classification model to the third encoded section to obtain a third section score;
applying a fourth classification model to the fourth encoded section to obtain a fourth section score;
generating a second confidence score based on the third encoded section and the fourth encoded section.

16. The non-transitory computer readable medium of claim 9, the method further comprising:
making a determination that the confidence score and the second confidence score meet a confidence threshold, and
based on the determination, sending a bug deduplication report to the client, wherein the confidence score and the second confidence score are specified in the bug deduplication report.

17. A system comprising:
a processor; and
memory comprising instructions, which when executed by the processor, perform a method comprising:
obtaining, by a bug deduplication system, a set of bugs;
performing an encoding on each section of a first bug of the set of bugs to obtain encoded sections, wherein the encoded sections comprise a first encoded section and a second encoded section, wherein each section of the first bug comprises a portion of an issue associated with the first bug, and wherein the encoded sections are generated using a neural network algorithm;

applying a first classification model to the first encoded section to obtain a first section score;

applying a second classification model to the second encoded section to obtain a second section score;

generating a confidence score based on the first encoded section and the second encoded section; and providing the confidence score to a client, wherein the client initiates a corrective action for the first bug based on the confidence score.

18. The system of claim 17, wherein the first classification model is generated using a machine learning model applied to first encoded sections of a first portion of the set of bugs, wherein the first encoded sections do not include the first encoded section.

19. The system of claim 17, wherein a section of the first bug comprises at least one of:

structured information, a summary of the first bug, and a long description.

20. The system of claim 17, the method further comprising:

performing a second encoding on each section of a second bug of the set of bugs to obtain additional encoded sections, wherein the additional encoded sections comprise a third encoded section and a fourth encoded section;

applying a third classification model to the third encoded section to obtain a third section score;

apply a fourth classification model to the fourth encoded section to obtain a fourth section score.

* * * * *